(12) United States Patent
Uhlmann et al.

(10) Patent No.: US 9,470,474 B1
(45) Date of Patent: Oct. 18, 2016

(54) DEVICE FOR CYCLICALLY OPERATING A FIREARM TRIGGER

(71) Applicants: Steven K. Uhlmann, Scottsdale, AZ (US); Thomas G. Kieran, Peoria, AZ (US)

(72) Inventors: Steven K. Uhlmann, Scottsdale, AZ (US); Thomas G. Kieran, Peoria, AZ (US)

(*) Notice: Subject to any disclaimer, the term of this patent is extended or adjusted under 35 U.S.C. 154(b) by 0 days.

(21) Appl. No.: 15/004,719

(22) Filed: Jan. 22, 2016

Related U.S. Application Data (63) Continuation of application No. 14/486,505, filed on Sep. 15, 2014, now Pat. No. 9,273,928.

(60) Provisional application No. 61/877,878, filed on Sep. 13, 2013.

(51) Int. Cl.
*F41C 27/00* (2006.01)
*G05B 19/05* (2006.01)

(52) U.S. Cl.
CPC ............. *F41C 27/00* (2013.01); *G05B 19/05* (2013.01); *G05B 2219/1106* (2013.01)

(58) Field of Classification Search
CPC .............. F41C 27/00; G05B 19/05; G05B 2219/1106; A41D 1/002; A41D 1/005; A63B 23/16
USPC .................................... 42/90; 482/44, 47, 48
See application file for complete search history.

(56) References Cited

U.S. PATENT DOCUMENTS

| | | | | |
|---|---|---|---|---|
| 4,875,469 A | * | 10/1989 | Brook | A61H 1/0288 482/48 |
| 4,903,864 A | | 2/1990 | Sirhan | |
| 5,516,249 A | * | 5/1996 | Brimhall | B25J 3/04 414/5 |
| 5,666,667 A | | 9/1997 | Hook, Jr. | |
| 5,673,436 A | * | 10/1997 | Piper | F41H 9/10 2/160 |
| 5,684,460 A | * | 11/1997 | Scanlon | A61B 5/113 340/573.1 |
| 5,771,492 A | * | 6/1998 | Cozza | A63B 69/3608 2/161.2 |
| 5,858,291 A | * | 1/1999 | Li | B29C 70/882 264/105 |
| 6,059,506 A | * | 5/2000 | Kramer | B25J 13/02 414/5 |
| 6,088,017 A | * | 7/2000 | Tremblay | G06F 3/011 345/156 |
| 6,500,041 B1 | * | 12/2002 | Crome, Jr. | A42B 1/004 2/195.1 |
| 6,678,986 B2 | | 1/2004 | Roush | |
| 7,056,297 B2 | * | 6/2006 | Dohno | A63B 21/00181 310/316.01 |
| 7,117,541 B2 | | 10/2006 | Hozack | |
| 8,029,414 B2 | * | 10/2011 | Ingvast | A61H 1/0288 482/4 |
| 8,036,704 B2 | | 10/2011 | Werner | |
| 8,060,948 B2 | | 11/2011 | Pesic | |

(Continued)

*Primary Examiner* — Joshua Freeman
(74) *Attorney, Agent, or Firm* — Thomas W. Galvani, P.C.; Thomas W. Galvani (57) ABSTRACT

A device for cyclically operating a trigger of a firearm includes biasing means for biasing a finger applied to a trigger away from the trigger, and a contact switch coupled to the biasing means and configured to be disposed between the finger and the trigger. In response to the contact switch detecting contact between the finger and the trigger, the biasing means actuates to cyclically bias the finger away from the trigger.

10 Claims, 5 Drawing Sheets

(56) References Cited

U.S. PATENT DOCUMENTS

| | | | | |
|---|---|---|---|---|
| 8,255,079 B2* | 8/2012 | Linn | B25J 9/0006 | 482/47 |
| 8,491,447 B1* | 7/2013 | Koranic | A63B 21/0421 | 482/44 |
| 8,622,939 B2* | 1/2014 | Nguyen | A61H 1/0288 | 482/44 |
| 9,067,325 B2* | 6/2015 | Ihrke | B25J 15/02 | |
| 9,104,271 B1* | 8/2015 | Adams | G06F 3/0426 | |
| 9,120,220 B2* | 9/2015 | Bergelin | B25J 9/0006 | |
| 9,273,928 B1* | 3/2016 | Uhlmann | F41C 27/00 | |
| 2003/0162634 A1* | 8/2003 | Farrell | A63B 23/16 | 482/47 |
| 2003/0195093 A1* | 10/2003 | White | A63B 21/0552 | 482/124 |
| 2005/0143679 A1* | 6/2005 | Gelber | A61H 7/005 | 601/15 |
| 2005/0273027 A1* | 12/2005 | Farrell | A63B 23/16 | 602/21 |
| 2007/0017138 A1 | 1/2007 | Young | | |
| 2007/0035143 A1* | 2/2007 | Blackwell | B25J 9/104 | 294/111 |
| 2010/0249675 A1* | 9/2010 | Fujimoto | A61H 1/0285 | 601/40 |
| 2012/0059290 A1* | 3/2012 | Yip | A61H 1/0288 | 601/40 |
| 2012/0065026 A1* | 3/2012 | Land | A63B 21/00065 | 482/47 |
| 2012/0206247 A1* | 8/2012 | Bhatia | G06F 3/016 | 340/407.1 |
| 2013/0219585 A1* | 8/2013 | Bergelin | B25J 9/0006 | 2/160 |
| 2013/0253705 A1* | 9/2013 | Goldfarb | A61F 2/583 | 700/260 |
| 2013/0303951 A1* | 11/2013 | Liu | A61H 23/00 | 601/46 |
| 2013/0310717 A1* | 11/2013 | Ranky | A63B 21/4025 | 601/40 |
| 2014/0222199 A1* | 8/2014 | Ihrke | B25J 9/104 | 700/253 |
| 2015/0141206 A1* | 5/2015 | James, Jr. | A63B 23/16 | 482/47 |
| 2015/0202514 A1* | 7/2015 | Ervin | A63B 69/0071 | 473/450 |

* cited by examiner

DEVICE FOR CYCLICALLY OPERATING A FIREARM TRIGGER

CROSS-REFERENCE TO RELATED APPLICATIONS

This application is a continuation of and claims the benefit of pending U.S. patent application Ser. No. 14/486,505, filed Sep. 15, 2014, which claims the benefit of U.S. Provisional Application No. 61/877,878, filed Sep. 13, 2013, all of which are hereby incorporated by reference.

FIELD OF THE INVENTION

The present invention relates generally to firearms, and more particularly to accessories for assisting in firing firearms.

BACKGROUND OF THE INVENTION

For hundreds of years, mankind has been fascinated with the propulsion of objects with black powder and the technology for enabling it. Whether launching a cannonball thousands of yards or firing a handgun, the act is an amazing and exhilarating experience. For the hobbyist, discharging a fully automatic weapon is invigorating and can be an incredibly fun and enjoyable sporting experience.

Many people have never experienced firing a fully automatic weapon. Fully automatic weapons—weapons which fire multiple rounds in response to a single trigger pull—are heavily regulated at both the state and federal level. Due in part to such legislation, but also because of low supply and complexity of manufacture, fully automatic weapons can be incredibly expensive.

As a result of the high price, low supply, and heavy regulation of fully automatic weapons, most hobbyists own only semi-automatic weapons. For purposes of definition, semi-automatic weapons are distinguished from fully automatic weapons in that semi-automatic weapons fire only a single shot for each pull of the trigger. There is thus a one-to-one correspondence between the discharge of a round from the firearm and depression of the trigger of the firearm in a semi-automatic weapon. Continuously depressing the trigger of a semi-automatic weapon does not result in the weapon discharging more than one bullet.

Various attempts have been made to modify semi-automatic weapons to fire in a fully automatic mode. However, these modifications usually involve dismantling the weapon and fundamentally altering the mechanisms that control firing. Not only are modifications such as these generally illegal, but they are also highly dangerous.

Others have attempted to supplement semi-automatic weapons with mechanisms that allow them to fire rapidly. However, these changes often make the weapon unstable, such that the owner cannot achieve precision or accuracy while shooting, and in some cases, may render the weapon dangerous, illegal, or both. An improved way of firing a semi-automatic weapon like a fully automatic weapon is needed.

SUMMARY OF THE INVENTION

According to one of a plurality of embodiments according to the principle of the invention, a device for cyclically operating a trigger of a firearm includes a glove having a finger stall and a pull mounted over the finger stall. A drive mechanism is coupled to the pull to move the finger stall rapidly from a bent configuration toward a straight configuration, thereby moving the finger stall away from the trigger very rapidly. When an operator attempts to continuously depress the trigger, the pull cyclically retracts his finger in the finger stall from the trigger, causing the firearm to be fired rapidly.

BRIEF DESCRIPTION OF THE DRAWINGS

Referring to the drawings.

DETAILED DESCRIPTION

Figure 1:
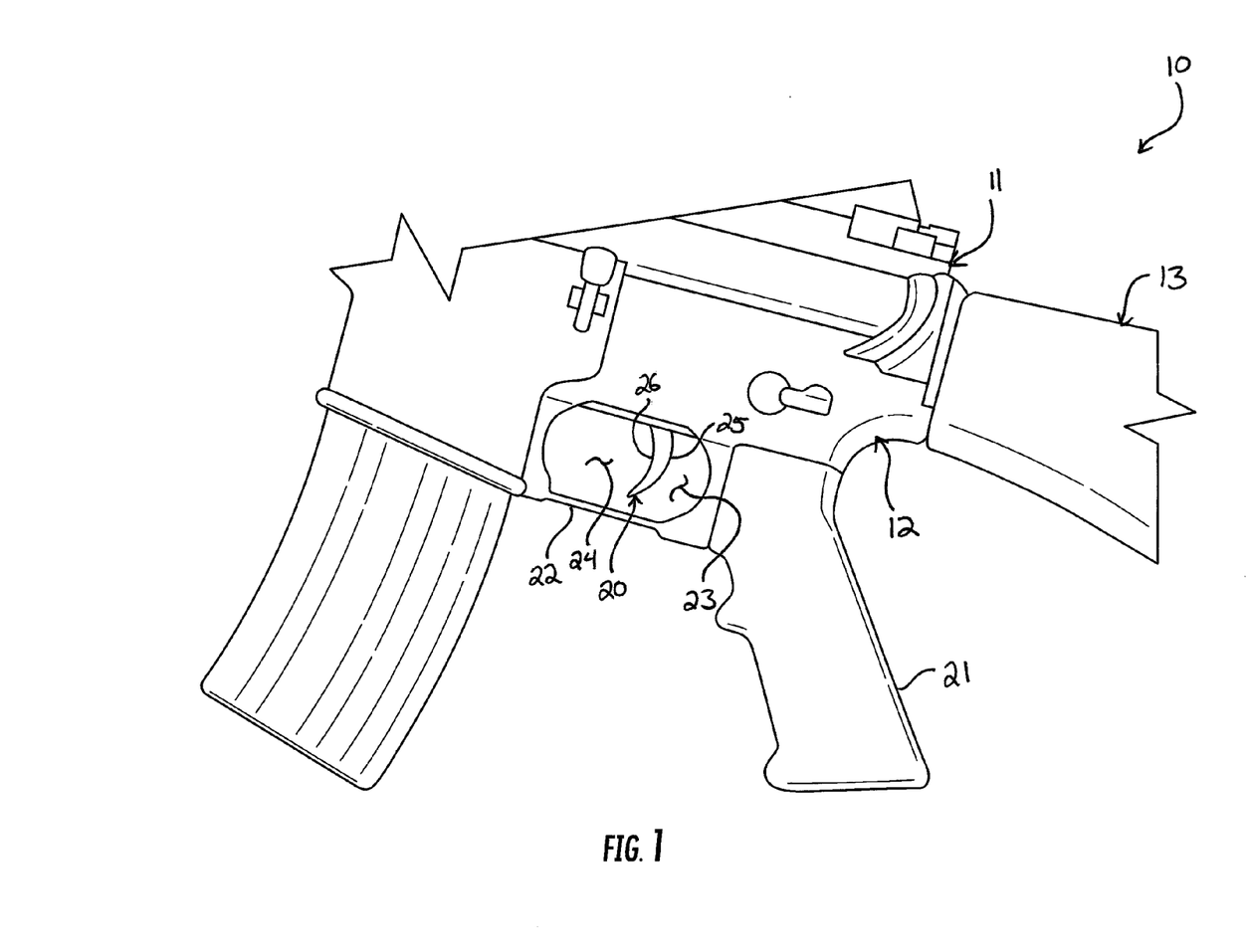
FIG. 1 is an enlarged side elevation view of a portion of a firearm.

Reference now is made to the drawings, in which the same reference characters are used throughout the different figures to designate the same elements. FIG. 1 illustrates a portion of a firearm 10 representative of the family of rifles including rifles such as the M-4, M-16, AR-15, and AR-10. Indeed, the firearm 10 is exemplary of many semi-automatic weapons, and reference in this description will be made to the firearm 10 with the understanding that the description applies equally to other semi-automatic weapons, and that reference to the firearm 10 is not meant to limit the present invention to a particular embodiment for use with an AR-15 firearm 10. The firearm 10 includes an upper receiver 11, a lower receiver 12, and a stock 13 coupled to an end of the upper receiver 11. The firearm 10 shown in FIG. 1 can be selectively set in either a semi- or fully-automatic mode; for purposes of discussion here, it will be assumed that the firearm 10 is set in the semi-automatic mode to always fire in a semi-automatic mode such that one bullet is discharged from the firearm 10 in response to each depression of a trigger 20. The trigger 20 is located on the lower receiver 12 just in front of a pistol grip 21 and within a rigid trigger guard 22 extending forward from the grip 21 and encircling the trigger 20.

The space between the trigger 20 and the grip 21 is herein referred to as a depression gap and is marked with the reference character 23, and the space in front of the trigger 20 is herein referred to as a finger gap and is marked with the reference character 24. The trigger itself has a rear face 25 which borders the depression gap 23, and an opposed front face 26 which borders the finger gap 24.

To fire the firearm 10, the trigger 20 must be depressed. The trigger 20 must be moved backward from a ready position, shown in FIG. 1, toward the grip 21 to a depressed position into the depression gap 23. Generally, the operator moves the trigger 20 by first extending his index finger proximate the trigger 20, then placing his index finger over the trigger 20, and then curling or bending the index finger inward or pulling back on the trigger 20 to depress the trigger 20. Depressing the trigger 20 once causes the firearm 10 to fire one bullet. Before the firearm 10 can be fired again, the trigger 20 must return from the depressed position to the ready position in FIG. 1, so the operator will let go of or release the trigger 20. Firearms typically have a spring or other mechanism which returns the trigger 20 to the ready position. The trigger 20 generally moves back to the ready position faster than the operator can extend his finger, so that every time the operator moves his finger away from or off of the trigger 20, the trigger 20 will reset to the ready position. One having ordinary skill in the art will readily understand this conventional operation of a trigger.

The present invention is a device that allows the operator of the firearm 10 to fire the weapon rapidly at speeds which emulate the fully-automatic fire of a fully-automatic weapon. The present invention accomplishes this by quickly returning the operator's finger to an extended position to allow the trigger 20 to return to the ready position, so that the trigger 20 may again be depressed by the finger of the operator. The operator feels as if he is firing a fully automatic weapon because he feels that he is continuously holding down or depressing the trigger down and firing multiple shots, while the device is actually quickly moving his finger off the trigger.

A First Embodiment

Figure 2A:
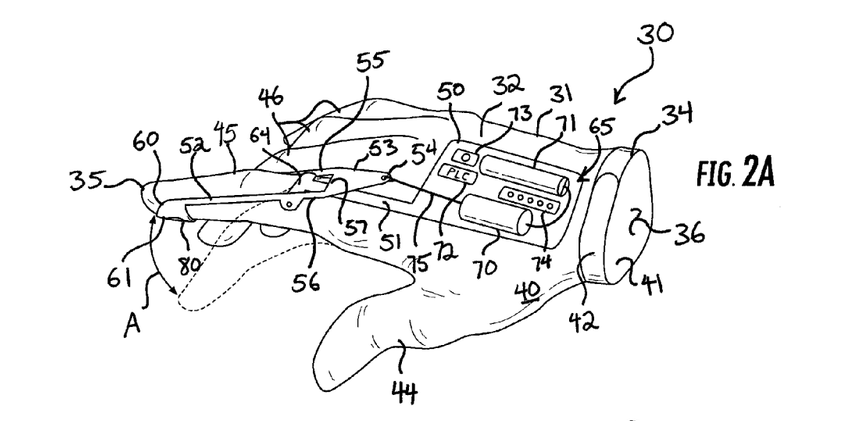
FIGS. 2A and 2B are top and bottom perspective views, respectively, of a first embodiment of a cyclical trigger operation device for use with the firearm of FIG. 1, the device being constructed and arranged according to the principle of the invention.
Figure 2B:
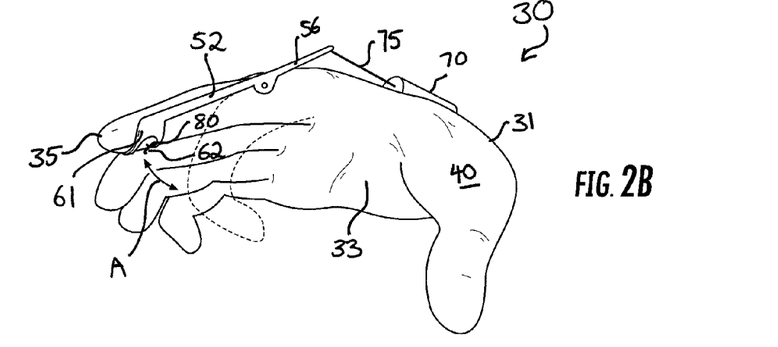

FIG. 2A and FIG. 2B illustrate an embodiment of the present invention, constructed and arranged according to the principle of the invention, referred to as a cyclical trigger operation device (hereinafter, "CTOD") and marked with the reference character 30. The CTOD 30 is adapted to be used with the firearm 10 of FIG. 1 to enable the operator to quickly and cyclically depress the trigger 20 of the firearm 10. The CTOD 30 includes a glove body 31 for receiving a human hand, having a palmar side 32 and an opposed dorsal side 33, a proximal end 34 with an opening 36, and an opposed distal end 35. The glove body 31 has an exterior surface 40 and an opposed interior surface 41 which bounds and defines an interior volume for receiving a hand which has been applied through the opening 36. A strap 42 is disposed on the exterior surface 40 and has an end secured to the exterior surface 40 and an opposed end free of the exterior surface 40. The strap 42 carries a fastener for adjustably fastening the strap 42 across the exterior surface at the opening 36, so as to selectively adjust the diameter of the opening 36 to fit loosely or snugly on a hand. The fastener is preferably a hook-and-loop fastener, with complementary fastening components on the strap 42 and on the exterior surface 40. In other embodiments, the fastener is a series of buttons, snap-buttons, magnets, or other suitable fasteners for releasably adjusting the dimension of the opening 36. In yet other embodiments, instead of a glove body 31, the CTOD 30 is applied and secured on the hand with several adjustable straps. A lower strap forms an annular band at the distal end of the base pad 50. An upper strap forms an annular band at the other end of the base pad 50. The lower and upper straps are constructed similarly and are adjustable to fit securely on the operator's hand. In some embodiments, the lower and upper straps are continuous elastic bands. In other embodiments the lower and upper straps each have first and second strap members with free ends which are secured to each other with hook-and-loop engagement elements, buttons, snap-buttons, magnets, or other suitable fasteners.

The glove body 31 includes a thumb stall 44, an index finger stall 45, and three other finger stalls 46. Each of the stalls 44, 45, and 46 are full-fingered sleeves extending from the glove body 31 to closed distal ends proximate the distal end 35 of the CTOD 30. In other embodiments, the stalls 44, 45, and 46 may only partially cover the thumb and fingers. The thumb stall 44 is for receiving a thumb of a human hand, the index finger stall 45 is for receiving the index finger, or trigger finger, on a human hand, and the three remaining finger stalls 46 are for receiving the middle, ring, and pinky fingers on a human hand. Each of the stalls 44, 45, and 46 fits snugly over the respective fingers so that there is little play in material over the fingers. The glove body 31 and the finger stalls 44, 45, and 46 are constructed from a material or combination of materials having material characteristics of durability and flexibility, such as nylon, polypropylene, or other similar material. Additionally, the palmar side 32 of the CTOD 30 may have a textured surface or pattern for enhanced gripping of an object such as the pistol grip 21 of the firearm 10.

The CTOD 30 includes a pull assembly having a base pad 50, a rigid spar 51 extending from the base pad 50 along the index finger stall 45, and a pull 52 pivoted to the spar 51 and further extending along the index finger stall 45. The pull 52 is a generally elongate beam member having a wide proximal end 53 proximate to the base pad 52 and formed with a hole 54. Two struts 55 and 56 extend from the proximal end 53 forwardly along either side of the index finger stall 45 to a distal end 60 of the pull 52. A wide, flat, coplanar stop 57 extends between the struts 55 and 56 proximate to the proximal end 53.

A cradle 61 is disposed at the distal end 60 of the pull 52 for holding the index finger stall 45 and preferably cradling a finger installed in the index finger stall 45. The cradle 61 is a concave, bowl-shaped member at the distal end extending between and supported by the struts 55 and 56. Seen best in FIG. 2B, a hole 62 is formed through the cradle 61 at a generally central and intermediate location in the cradle 61. When the CTOD 30 is worn by an operator, the cradle 61 is disposed near the pad of the operator's finger, and the hole 62 is disposed at a site along the operator's finger at which his finger contacts the trigger 20. The hole 62 thus allows the operator to feel the trigger 20 when wearing the glove body 31 and through the pull 52.

The pull 52 is pivoted to the spar 51 at a distal end 63 of the spar 51 to move along a path identified with double-arrowed arcuate line A in FIGS. 2A and 2B. The distal end 63 of the spar 51 carries an axle 64 extending between the struts 55 and 56 of the pull 52. The struts 55 and 56 are mounted for pivotal movement to the axle 64 at a generally intermediate location with respect to the proximal and distal ends 53 and 60 of the pull 52, and between the second and third knuckles (where the first knuckle is the knuckle closest to the tip of the finger and the third knuckle is the knuckle closest to the palm). The pull 52 pivots between (1) a first position, in which the pull 52 is transverse to the spar 51 and the base pad 50, and the index finger stall 45, as shown in broken line in FIGS. 2A and 2B, is curled, as would occur when the operator is depressing his finger against the trigger 20 in a curled position of the finger, and (2) a second position, in which the pull 52 is generally parallel to the spar 51 and the base pad 50, and the index finger stall 45, as shown in solid line in FIGS. 2A and 2B, is straightened, as would occur when the operator's finger is moved off of the trigger 20 in an extended position of the finger. Movement past the second position is limited by the stop 57, which, when the pull 52 is in the second position thereof, is in contact with the spar 51 and prevents further movement along line A. In the first position of the pull 52, the pull 52 is proximate to the trigger 20, and in the second position of the pull 52, the pull 52 is away from the trigger 20.

Still referring to FIGS. 2A and 2B, the spar 51 supports the pull 52 and the movement of the pull 52 through and between the first and second positions of the pull 52. The spar 51 is integrally formed to the base pad 50 and extends parallel from the base pad 50 to the distal end 63 of the spar 51. The base pad 50 carries a drive mechanism 65 for controlling the movement of the pull 52 and the index finger stall 45.

The base pad 50, which may be flexible, is applied to the dorsal side 32 of the CTOD 30. The base pad 50 is a mount for a pneumatic cylinder 70 with a stroke that is generally aligned along the length of the spar 51. The base pad 50 also carries a gas supply 71 to supply a gas to the pneumatic cylinder 70. In FIG. 2A, the gas supply 71 is a cylindrical housing. The gas supply 71 is preferably a replaceable gas cartridge, such as a CO2 cartridge. Such CO2 cartridges can be coupled to the pneumatic cylinder 70. An onboard programmable logic controller 72 is mounted on the base pad 52 and powered by a small battery 73. The programmable logic controller 72 controls the application and removal of gas to and from the pneumatic cylinder 70. A plurality of switches 74 are also carried on the base pad 52 and coupled to the programmable logic controller 72, so that the user may depress or select one of the plurality of switches to instruct the programmable logic controller to control the drive mechanism 65 in a particular, pre-programmed way, as is discussed later. A cable 75 extends from the pneumatic cylinder 70 to the hole 54 in the proximal end 53 of the pull 52, thereby operatively coupling the drive mechanism 65 to the pull 52 to impart movement to the pull 52 in response to actuation of the drive mechanism 65.

The pneumatic cylinder 70 is aligned with the index finger stall 45, and the cable 75 is coupled to a piston in the pneumatic cylinder 70. The piston in the pneumatic cylinder 70 intermittently and cyclically reciprocates between a forward position and a retracted position in the pneumatic cylinder 70. Actuation of the pneumatic cylinder 70 retracts the cable 75. When the index finger stall 45 is bent, such as would occur when a finger applied to the index finger stall 45 is curled around the trigger 20, the cable 75 is extended and ready to be retracted so as to extend the index finger stall 45 and the index finger applied thereto. When the cable 75 is retracted, the cable 75 is drawn back, and the proximal end 53 of the pull 52 is drawn toward the proximal end 34 of the glove body 31 to move the pull 52 into the second position thereof. This causes the index finger stall 45 to extend toward a straightened configuration. When the pneumatic cylinder 70 retracts the cable 75 quickly, the operator's index finger is moved quickly toward the extended and straightened position thereof.

In operation, an operator places his hand into the CTOD 30 by applying his hands fingers-first through the opening 36 and directing each of his fingers into the appropriate finger stall. The operator ensures that the cradle 61 is on the underside of his finger. When the operator has comfortably fit the CTOD 30 on his hand, he adjusts the strap 42 by drawing the free end back away from the exterior surface 40 of the glove body 31 and re-applying it so as to secure the fastener and fix the dimension of the opening 36 as is comfortably snug on the operator's wrist.

The operator then selects the desired performance of the CTOD 30 by selecting one of the plurality of switches 74. The switches 74 each correspond to various performance functions of the CTOD 30. Some of the switches allow the operator to select a cycling speed. For instance, the operator may select a switch setting the cycling speed at three hundred revolutions per minute ("rpm"), in response to which the pneumatic cylinder will reciprocate approximately three hundred times in one minute to cycle movement of the pull 52 three hundred times in a minute, emanating a fast firing firearm. In another example, the operator may select a switch setting the cycling speed at nine hundred rpm, in response to which the pneumatic cylinder will reciprocate approximately nine hundred times in one minute to cycle movement of the pull 52 nine hundred times in a minute, emulating a very fast firing firearm. Some of the switches allow the operator to select a cycling duration. For example, the operator may select a switch setting the cycling duration to three pulses, in which case the pneumatic cylinder will reciprocate three times and then pause or stop, so as to emulate a three-round burst of fire. In another example, the operator may select a switch setting the cycling duration to five pulses, in which case the pneumatic cylinder will reciprocate five times, so as to emulate a five-round burst of fire. In yet another example, the operator may select a switch setting the cycling duration to two seconds, in which case the pneumatic cylinder will reciprocate for two seconds, so as fire repeatedly for two seconds and then pause or stop.

After setting the performance of the CTOD 30, the operator grips the firearm 10 at the pistol grip 21, placing his index finger proximate to the trigger 20. The operator shoulders or readies the firearm 10 and takes aim at a target. Once a target is acquired, the operator fires the weapon by placing his finger against the trigger 20 and depressing or pulling the trigger 20 back toward the grip 21. Preferably, the operator continuously depresses his finger against the trigger 20.

The cradle of the pull 52 carries a contact switch 80. As seen in FIG. 2B, the contact switch 80 is located on the palmar side 32, or underside, of the index finger stall 45, against the cradle 61 but within the hole 62, such that the contact switch 80 is disposed between the finger applied to the index finger stall 45 and the trigger 20. The contact switch 80 is preferably a pressure switch which detects contact between the finger and the trigger 20, responsive to two to three pounds such that when two to three pounds of pressure are applied at the contact switch 80, the contact switch 80 issues an activation signal. When the operator's finger is placed against the trigger 20 and curled into the first position of the pull 52, thus depressing to pull the trigger 20, the contact switch 80 is closed, and the contact switch 80 transmits an activation signal to the programmable logic controller 72 in the drive mechanism 65.

The activation signal is transmitted along an electrical wire (not shown) which is coupled to the programmable logic controller 72, and which is preferably sewn into the index finger stall 45 and the glove body 31. In response to receiving the signal, the programmable logic controller 72 causes gas to be intermittently and cyclically supplied to and drawn from the pneumatic cylinder 70, such as through an on-board valve, according to the pre-programmed control instructions corresponding to the selected one the of the plurality of switches 74, causing the pneumatic cylinder 70 to reciprocate, and causing the cable 75 to be intermittently and cyclically retracted. In response, the operator's index finger, applied in the index finger stall 45 is intermittently and cyclically retracted toward the extended position along double-arrowed arcuate line A in FIGS. 2A and 2B. The operator, however, continues to hold his finger down in the curled position to depress the trigger 20. When the pneumatic cylinder 70 retracts the cable 75, a greater force is applied to the operator's finger than he applies to it, so that the finger is pulled to the extended position and the first position of the pull 52. In the extended position of the finger, the finger is pulled off of or away from the trigger 20, and the trigger 20 is returned to the ready position by the spring or other mechanism which returns the trigger 20 to the ready position. When the pneumatic cylinder 70 has retracted a full stroke, the supply of gas to the pneumatic cylinder 70 is removed, as instructed by the programmable logic controller 72, the operator's own force of his finger is now able to overcome the pneumatic cylinder 70, and his finger curls along line A to depress the trigger 20. When his finger depresses the trigger 20, it extends the pneumatic cylinder 70 a full stroke length so that the pneumatic cylinder 70 is ready to retract. With the operator continuing to curl his finger, and with the pneumatic cylinder 70 intermittently and cyclically retracting the cable 75 to intermittently and cyclically extend the finger, the pull 52 is intermittently and cyclically moved between the first and second positions thereof, the index finger stall 45 is moved intermittently and cyclically between the bent and straightened configurations, the operator's finger is intermittently and cyclically curled and extended, and the trigger 20 is intermittently and cyclically depressed to the depressed position and allowed to return to the ready position. In this way, the firearm 10 intermittently and rapidly fires bullets, emulating fully-automatic fire.

A Second Embodiment

Figure 2C:
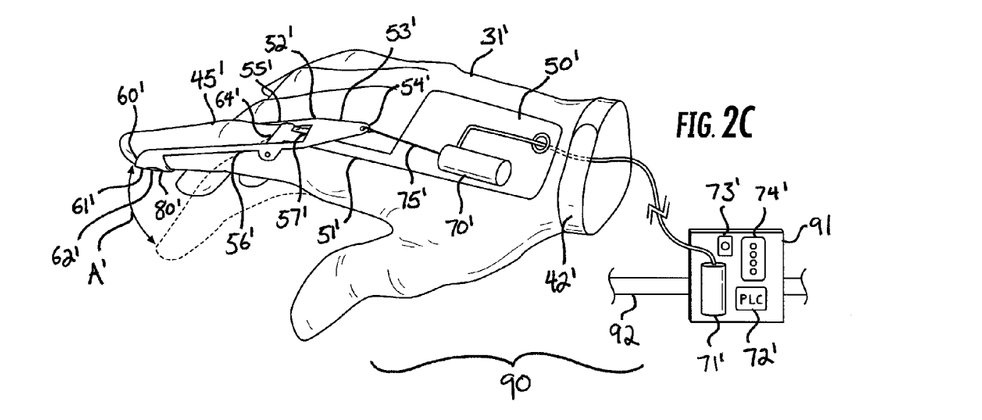
FIG. 2C is a top perspective view of a second embodiment of a cyclical trigger operation device for use with the firearm of FIG. 1, the device being constructed and arranged according to the principle of the invention.

FIG. 2C illustrates an embodiment of the present invention, constructed and arranged according to the principle of the invention, referred to as a cyclical trigger operation device (hereinafter, "CTOD") and marked with the reference character 90. The CTOD 90 is adapted to be used with the firearm 10 of FIG. 1 to enable the operator to quickly and cyclically depress the trigger 20 of the firearm 10. The CTOD 90 is very similar to the CTOD 30 and includes many identical structural features elements with the CTOD 30. Those structural features and elements of the CTOD 90 which are identical to corresponding structural features and elements in the CTOD 30 are marked with identical reference characters, but are designated with a prime ("'") symbol to distinguish them from those of the CTOD 30. In some cases, the CTOD 90 has identical structural features and elements as the CTOD 30 but located in alternate locations. In such cases, the same reference character will be used, with the prime symbol, but the alternate location will be described. Where the CTOD 90 has identical structural features and elements as the CTOD 30 and those structural features and elements are located and used in an identical manner as in the CTOD 30, they will merely be listed, as describing them would be unduly repetitive and burdensome for the reader. It should be understood, then, that the description for the particular structural feature or element with respect to the CTOD 30 is equally applicable to the corresponding identical structural feature and element with respect to the CTOD 90, unless otherwise described. Finally, for simplicity of the illustrations, not all identical reference characters will be shown, if their corresponding identical reference characters are shown in a figure illustrating an alternate embodiment.

The CTOD 90 includes a glove body 31', a dorsal side 32', a palmar side 33', a proximal end 34', a distal end 35', an opening 36', an exterior surface 40', an interior surface 41', a strap 42', a thumb stall 44', an index finger stall 45', and finger stalls 46'. The CTOD 90 includes a base pad 50', a spar 51' extending from a distal end 63' at the base pad 50' to an axle 64', and a pull 52' pivoted to the axle 64' on the spar 51' for movement along the double-arrowed arcuate line A' in FIG. 2C. The pull 52' includes a proximal end 53', a hole 54', struts 55' and 56', a stop 57', a distal end 60', a cradle 61', a hole 62', and a contact switch 80'. The base pad 50' also carries a pneumatic cylinder 70', which is coupled to the pull 52' with a cable 75'. However, the gas supply 71', the programmable logic controller 72', the battery 73', and the switches 74' are off of the glove body 31', preferably on a mount or platform 91 carried on a belt 92 around the operator's waist. A long hose 93 extends from the gas supply 71', off the belt, across the operator's torso, down the operator's arm, and onto the base pad 50', where the hose 93 couples with the pneumatic cylinder 70' to provide gas to the pneumatic cylinder 70'. With the gas supply 71' located off the glove body 31', a larger-sized gas supply 71' is carried than in the CTOD 30, so that the gas supply 71' lasts longer and needs to be replaced less frequently than with the CTOD 30.

Operation of the CTOD 90 is similar to that of the CTOD 30. The piston in the pneumatic cylinder 70' intermittently and cyclically reciprocates between a forward position and a retracted position in the pneumatic cylinder 70'. Gas is supplied to the pneumatic cylinder 70' through the hose 93. Actuation of the pneumatic cylinder 70' retracts the cable 75'. When the index finger stall 45' is bent, such as would occur when a finger applied to the index finger stall 45' is curled around the trigger 20, the cable 75' is extended and ready to be retracted so as to extend the index finger stall 45' and the index finger applied thereto. When the cable 75' is retracted, the cable 75' is drawn back, and the proximal end 53' of the pull 52' is drawn toward the proximal end 34' of the glove body 31' to move the pull 52' into the second position thereof. This causes the index finger stall 45' to straighten. When the pneumatic cylinder 70' retracts the cable 75' quickly, the operator's index finger is quickly returned toward the extended position thereof.

A Third Embodiment

Figure 3A:
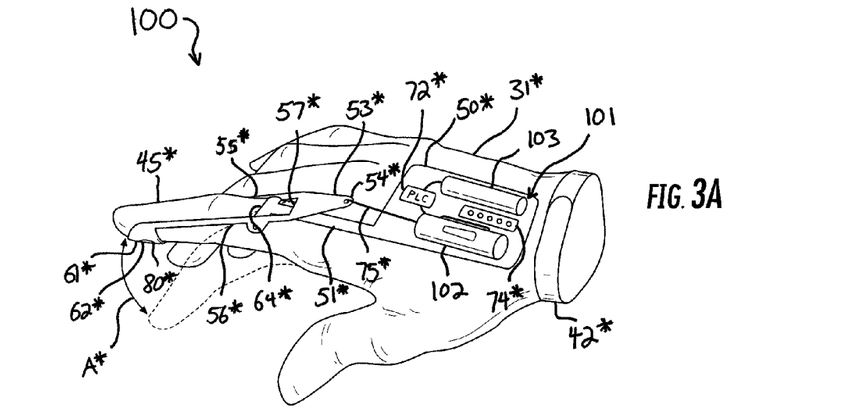
FIG. 3A is a top perspective view of a third embodiment of a cyclical trigger operation device for use with the firearm of FIG. 1, the device being constructed and arranged according to the principle of the invention.

FIG. 3A illustrates an embodiment of the present invention, constructed and arranged according to the principle of the invention, referred to as a cyclical trigger operation device (hereinafter, "CTOD") and marked with the reference character 100. The CTOD 100 is adapted to be used with the firearm 10 of FIG. 1 to enable the operator to quickly and cyclically depress the trigger 20 of the firearm 10. The CTOD 100 is very similar to the CTOD 30 and includes many identical structural features elements with the CTOD 30. Those structural features and elements of the CTOD 100 which are identical to corresponding structural features and elements in the CTOD 30 are marked with identical reference characters, but are designated with an asterisk ("*") symbol to distinguish them from those of the CTOD 30. Where the CTOD 100 has identical structural features and elements as the CTOD 30, they will merely be listed, as describing them would be unduly repetitive and burdensome for the reader. It should be understood, then, that the description for the particular structural feature or element with respect to the CTOD 30 is equally applicable to the corresponding identical structural feature and element with respect to the CTOD 100, unless otherwise described. Finally, for simplicity of the illustrations, not all identical reference characters will be shown, if their corresponding identical reference characters are shown in a figure illustrating an alternate embodiment.

The CTOD 100 includes a glove body 31*, a dorsal side 32*, a palmar side 33*, a proximal end 34*, a distal end 35*, an opening 36*, an exterior surface 40*, an interior surface 41*, a strap 42*, a thumb stall 44*, an index finger stall 45*, and finger stalls 46*. The CTOD 100 includes a base pad 50*, a spar 51* extending from a distal end 63* at the base pad 50* to an axle 64*, and a pull 52* pivoted to the axle 64* on the spar 51* for movement along the double-arrowed arcuate line A* in FIG. 2C. The pull 52* includes a proximal end 53*, a hole 54*, struts 55* and 56*, a stop 57*, a distal end 60*, a cradle 61*, a hole 62*, and a contact switch 80*.

The base pad 50* carries a drive mechanism 101 for controlling the movement of the pull 52* and the index finger stall 45*. The base pad 50* carries an electronic solenoid 102, which is coupled to the pull 52* with a cable 75*. The solenoid 102 includes a piston or piston head that reciprocates through a stroke that is generally aligned parallel to the length of the spar 51*. A battery 102 is coupled to the solenoid 102 to provide the solenoid with power. An onboard programmable logic controller 72* is mounted on the base pad 52* and powered by the battery 103. The programmable logic controller 72* controls the provision of current to the solenoid 102. A plurality of switches 74* are also carried on the base pad 52* and coupled to the programmable logic controller 72*, so that the user may depress or select one of the plurality of switches to instruct the programmable logic controller to control the drive mechanism 101 in a particular, pre-programmed way.

The solenoid 102 is aligned with the index finger stall 45*, and the cable 75* is coupled to the piston in the solenoid 102. The piston in the solenoid 102 intermittently and cyclically reciprocates between a forward position and a retracted position in the solenoid 102. Actuation of the solenoid 102 retracts the cable 75*. When the index finger stall 45* is bent, such as would occur when a finger applied to the index finger stall 45* is curled around the trigger 20, the cable 75* is extended and ready to be retracted so as to extend the index finger stall 45* and the index finger applied thereto. When the cable 75* is retracted, the cable 75* is drawn back, and the proximal end 53* of the pull 52* is drawn toward the proximal end 34* of the glove body 31* to move the pull 52* into the second position thereof. This causes the index finger stall 45* to straighten. When the solenoid 102 retracts the cable 75* quickly, the operator's index finger is quickly returned toward the extended position thereof.

As with the CTOD 30 and the CTOD 90, the operator can select the desired performance of the CTOD 100 by selecting one of the plurality of switches 74*, and, when the operator's finger is placed against the trigger 20 and depressed to pull the trigger 20, the contact switch 80* is closed, and the contact switch 80* transmits a signal to the programmable logic controller 72* in the drive mechanism 101. In response to receiving the signal, the programmable logic controller 72* causes current to be intermittently and cyclically supplied to the solenoid, according to the pre-programmed control instructions corresponding to the selected one the of the plurality of switches 74*, causing the solenoid 102 to reciprocate, and causing the cable 75* to be intermittently and cyclically retracted. In response, the operator's index finger, applied in the index finger stall 45* is intermittently and cyclically retracted toward the extended position along double-arrowed arcuate line A* in FIG. 3A. The operator, however, continues to hold his finger down in the curled position to depress the trigger 20. When the solenoid 102 retracts the cable 75*, a greater force is applied to the operator's finger than he applies to it, so that the finger is pulled to the extended position. In the extended position of the finger, the finger is pulled off of or away from the trigger 20, and the trigger 20 is returned to the ready position by the spring or other mechanism which returns the trigger 20 to the ready position. When the solenoid 102 has retracted a full stroke, the application of current to the solenoid 102 is removed, as instructed by the programmable logic controller 72*, the operator's own force on his finger is now able to overcome the solenoid 102, and his finger curls along line A* to depress the trigger 20. When his finger depresses the trigger 20, it extends the solenoid 102 a full stroke length so that the solenoid 102 is ready to retract. With the operator continuing to curl his finger, and the solenoid 102 intermittently and cyclically retracting the cable 75* to intermittently and cyclically extend the finger, the operator's finger is intermittently and cyclically curled and extended, and the trigger 20 is intermittently and cyclically depressed to the depressed position and allowed to return to the ready position. In this way, the firearm 10 intermittently and rapidly fires bullets, emulating fully-automatic fire.

A Fourth Embodiment

Figure 3B:
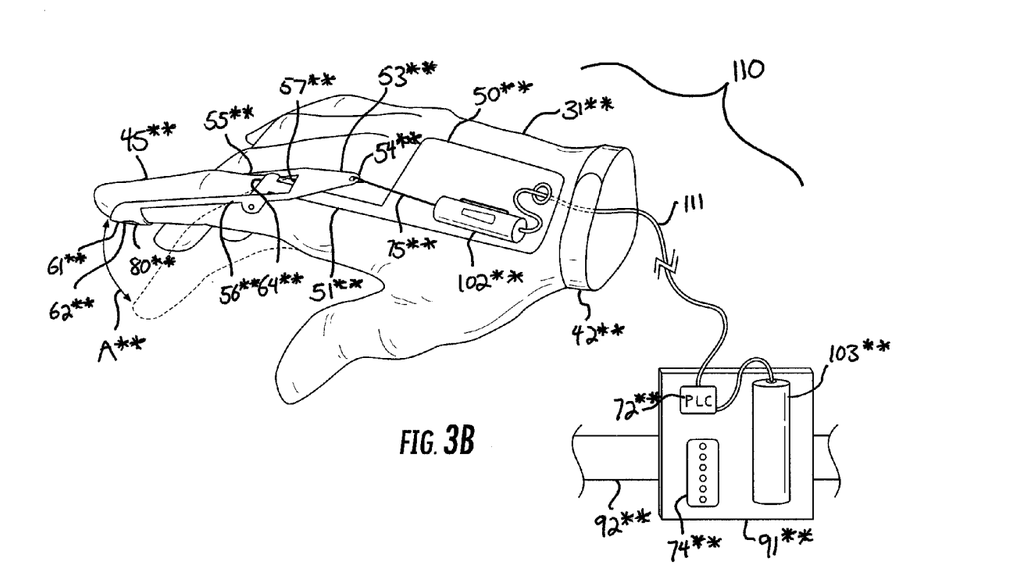
FIG. 3B is a top perspective view of a fourth embodiment of a cyclical trigger operation device for use with the firearm of FIG. 1, the device being constructed and arranged according to the principle of the invention.

FIG. 3B illustrates an embodiment of the present invention, constructed and arranged according to the principle of the invention, referred to as a cyclical trigger operation device (hereinafter, "CTOD") and marked with the reference character 110. The CTOD 110 is adapted to be used with the firearm 10 of FIG. 1 to enable the operator to quickly and cyclically depress the trigger 20 of the firearm 10. The CTOD 110 is very similar to the CTOD 100 and includes many identical structural features elements with the CTOD 100. Those structural features and elements of the CTOD 110 which are identical to corresponding structural features and elements in the CTOD 100 are marked with identical reference characters, but are designated with a double asterisk ("**") symbol to distinguish them from those of the CTOD 100. In some cases, the CTOD 110 has identical structural features and elements as the CTOD 100 but located in alternate locations. In such cases, the same reference character will be used, with the prime symbol, but the alternate location will be described. Where the CTOD 110 has identical structural features and elements as the CTOD 100 and those structural features and elements are located and used in an identical manner as in the CTOD 100, they will merely be listed, as describing them would be unduly repetitive and burdensome for the reader. It should be understood, then, that the description for the particular structural feature or element with respect to the CTOD 100 is equally applicable to the corresponding identical structural feature and element with respect to the CTOD 110, unless otherwise described. Finally, for simplicity of the illustrations, not all identical reference characters will be shown, if their corresponding identical reference characters are shown in a figure illustrating an alternate embodiment.

The CTOD 110 includes a glove body 31, a dorsal side 32, a palmar side 33, a proximal end 34, a distal end 35, an opening 36, an exterior surface 40, an interior surface 41, a strap 42, a thumb stall 44, an index finger stall 45, and finger stalls 46. The CTOD 110 includes a base pad 50, a spar 51 extending from a distal end 63 at the base pad 50 to an axle 64, and a pull 52 pivoted to the axle 64 on the spar 51 for movement along the double-arrowed arcuate line A in FIG. 3B. The pull 52 includes a proximal end 53, a hole 54, struts 55 and 56, a stop 57, a distal end 60, a cradle 61, a hole 62, and a contact switch 80. The base pad 50 also carries an electronic solenoid 102, which is coupled to the pull 52 with a cable 75. The solenoid 102 includes a piston or piston head that reciprocates through a stroke that is generally aligned parallel to the length of the spar 51*. However, the battery 103, the programmable logic controller 72, and the switches 74 are each off of the glove body 31, preferably on a mount or platform 91 carried on a belt 92 around the operator's waist. A long cable 111 extends from the battery 103, off the belt 92, across the operator's torso, down the operator's arm, and onto the base pad 50, where the cable 111 couples with the solenoid 102 to provide current to the solenoid 102. With the battery 103 located off the glove body 31, a larger-sized battery 103 is carried than in the CTOD 100, so that the battery 103** lasts longer and provides more current, and thus needs to be replaced less frequently than with the CTOD 100.

Operation of the CTOD 110 is similar to that of the CTOD 100. The piston in the solenoid 102 intermittently and cyclically reciprocates between a forward position and a retracted position in the solenoid 102. Current is supplied to the solenoid 102 through the cable 111 from the battery 103. Actuation of the solenoid 102 retracts the cable 75. When the index finger stall 45 is bent, such as would occur when a finger applied to the index finger stall 45 is curled around the trigger 20, the cable 75 is extended and ready to be retracted so as to extend the index finger stall 45 and the index finger applied thereto. When the cable 75 is retracted, the cable 75 is drawn back, and the proximal end 53 of the pull 52 is drawn toward the proximal end 34 of the glove body 31 to move the pull 52 into the second position thereof. This causes the index finger stall 45 to straighten. When the solenoid 102 retracts the cable 75 quickly, the operator's index finger is quickly returned toward the extended position thereof.

A Fifth Embodiment

Figure 4A:
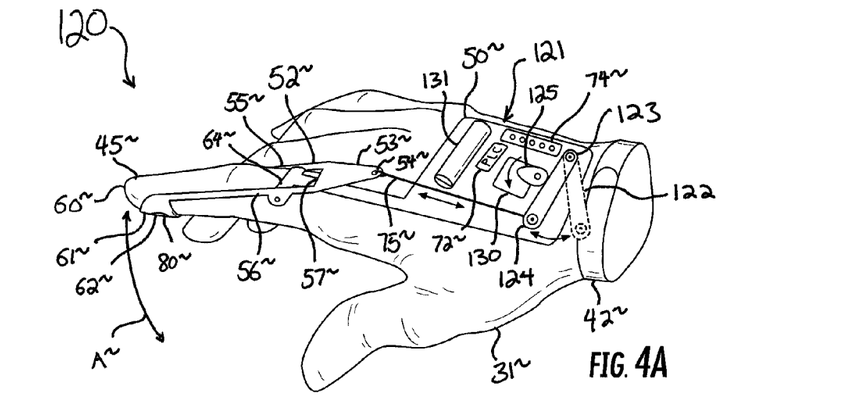
FIG. 4A is a top perspective view of a fifth embodiment of a cyclical trigger operation device for use with the firearm of FIG. 1, the device being constructed and arranged according to the principle of the invention.

FIG. 4A illustrates an embodiment of the present invention, constructed and arranged according to the principle of the invention, referred to as a cyclical trigger operation device (hereinafter, "CTOD") and marked with the reference character 120. The CTOD 120 is adapted to be used with the firearm 10 of FIG. 1 to enable the operator to quickly and cyclically depress the trigger 20 of the firearm 10. The CTOD 120 is similar to the CTOD 30 and includes many identical structural features elements with the CTOD 30. Those structural features and elements of the CTOD 120 which are identical to corresponding structural features and elements in the CTOD 30 are marked with identical reference characters, but are designated with a tilde ("~") symbol to distinguish them from those of the CTOD 30. Where the CTOD 120 has identical structural features and elements as the CTOD 30, they will merely be listed, as describing them would be unduly repetitive and burdensome for the reader. It should be understood, then, that the description for the particular structural feature or element with respect to the CTOD 30 is equally applicable to the corresponding identical structural feature and element with respect to the CTOD 120, unless otherwise described. Finally, for simplicity of the illustrations, not all identical reference characters will be shown, if their corresponding identical reference characters are shown in a figure illustrating an alternate embodiment.

The CTOD 120 includes a glove body 31~, a dorsal side 32~, a palmar side 33~, a proximal end 34~, a distal end 35~, an opening 36~, an exterior surface 40~, an interior surface 41~, a strap 42~, a thumb stall 44~, an index finger stall 45~, and finger stalls 46~. The CTOD 120 includes a base pad 50~, a spar 51~ extending from a distal end 63~ at the base pad 50~ to an axle 64~, and a pull 52~ pivoted to the axle 64~ on the spar 51~ for movement along the double-arrowed arcuate line A~ in FIG. 2C. The pull 52~ includes a proximal end 53~, a hole 54~, struts 55~ and 56~, a stop 57~, a distal end 60~, a cradle 61~, a hole 62~, and a contact switch 80~.

The base pad 50~ carries a drive mechanism 121 for controlling the movement of the pull 52~ and the index finger stall 45~. The drive mechanism 121 includes a lever arm 122 having a pivot end 123 secured to the base pad 50~ and an opposed free end 124. A cable 75~ extends from the free end 124 to the hole 54~ in the proximal end 53~ of the pull 52~, so that movement of the lever arm 122 imparts movement to the cable 75~ and thus also to the pull 52~. The drive mechanism 121 also includes an eccentric 125 mounted for rotational movement on the base pad 50~. The eccentric 125 is disposed proximate to the lever arm 122 between the pivot and free ends 123 and 124. The eccentric 125 is mounted to a motor 130, powered by a battery 131 on the base pad 50~, and as the motor rotates the eccentric 125, which has an off-center axis of rotation, the eccentric 125 rotates as a plain bearing against the lever arm 122, causing the lever arm 122 to pivot cyclically, or oscillate, about the pivot end 123 in response to the rotational movement of the eccentric 125. An onboard programmable logic controller 72~ is mounted on the base pad 52~ and powered by the battery 131. The programmable logic controller 72~ controls the provision of current to the motor 130, and thus controls the rotation of the eccentric 125 and the oscillation of the lever arm 122. A plurality of switches 74~ are also carried on the base pad 52~ and coupled to the programmable logic controller 72~, so that the user may depress or select one of the plurality of switches to instruct the programmable logic controller to control the drive mechanism 121 in a particular, pre-programmed way.

The lever arm 122 oscillates between a forward position and a retracted position. Actuation of the lever arm 122 in the retracted position retracts the cable 75~. When the index finger stall 45~ is bent, such as would occur when a finger applied to the index finger stall 45~ is curled around the trigger 20, the cable 75~ is extended and ready to be retracted so as to extend the index finger stall 45~ and the index finger applied thereto. When the cable 75~ is retracted, the cable 75~ is drawn back, and the proximal end 53~ of the pull 52~ is drawn toward the proximal end 34~ of the glove body 31~ to move the pull 52~ into the second position thereof. This causes the index finger stall 45~ to straighten. When the lever arm 122 retracts the cable 75~ quickly, the operator's index finger is quickly returned toward the extended position thereof.

As with the other embodiments of the CTOD 30, 90, 100, and 110, the operator can select the desired performance of the CTOD 120 by selecting one of the plurality of switches 74~, and, when the operator's finger is placed against the trigger 20 and depressed to pull the trigger 20, the contact switch 80~ is closed, and the contact switch 80~ transmits a signal to the programmable logic controller 72~ in the drive mechanism 121. In response to receiving the signal, the programmable logic controller 72~ causes current to be supplied to the motor 130 to rotate, according to the preprogrammed control instructions corresponding to the selected one the of the plurality of switches 74~. In response, the eccentric 125 rotates against the lever arm 122, imparting oscillatory movement to the lever arm 122. The cable 75~, connected to the free end 124 of the lever arm 125, is intermittently and cyclically retracted in response. This causes the pull 52~ to intermittently and cyclically move along the double-arrowed arcuate line A~, and, in response, the operator's index finger, applied in the index finger stall 45~ is intermittently and cyclically retracted toward the extended position along line A~ in FIG. 4A. The operator, however, continues to hold his finger down in the curled position to depress the trigger 20.

When the lever arm 122 retracts the cable 75~, a greater force is applied to the operator's finger than he applies to it, so that the finger is pulled to the extended position. In the extended position of the finger, the finger is pulled off of or away from the trigger 20, and the trigger 20 is returned to the ready position by the spring or other mechanism which returns the trigger 20 to the ready position. When the lever arm 122 has retracted a full stroke, the eccentric is in contact with the lever arm 122 and is about to rotate to a low displacement position in its cycle, as instructed by the programmable logic controller 72~, and so the operator's own force on his finger is now able to overcome the lever arm 122, and his finger curls along line A~ to depress the trigger 20. When his finger depresses the trigger 20, it moves the lever arm 122 into the forward position thereof, where the lever arm 122 is ready to be pushed back into the retracted position by the rotating eccentric 125. With the operator continuing to curl his finger, and the lever arm 122 intermittently and cyclically retracting the cable 75~ so as to intermittently and cyclically extend the finger, the operator's finger is intermittently and cyclically curled and extended, and the trigger 20 is intermittently and cyclically depressed to the depressed position and allowed to return to the ready position. In this way, the firearm 10 intermittently and rapidly fires bullets, emulating fully-automatic fire.

A Sixth Embodiment

Figure 4B:
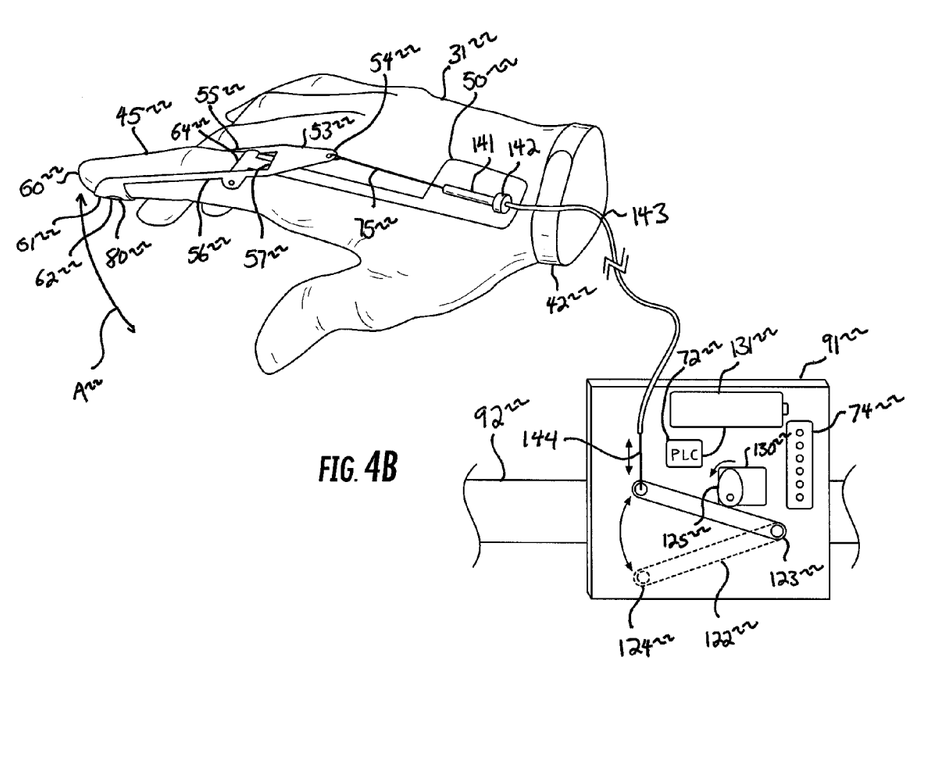
FIG. 4B is a top perspective view of a sixth embodiment of a cyclical trigger operation device for use with the firearm of FIG. 1, the device being constructed and arranged according to the principle of the invention.

FIG. 4B illustrates an embodiment of the present invention, constructed and arranged according to the principle of the invention, referred to as a cyclical trigger operation device (hereinafter, "CTOD") and marked with the reference character 140. The CTOD 140 is adapted to be used with the firearm 10 of FIG. 1 to enable the operator to quickly and cyclically depress the trigger 20 of the firearm 10. The CTOD 140 is very similar to the CTOD 120 and includes many identical structural features elements with the CTOD 120. Those structural features and elements of the CTOD 140 which are identical to corresponding structural features and elements in the CTOD 120 are marked with identical reference characters, but are designated with a double tilde ("~~") symbol to distinguish them from those of the CTOD 120. In some cases, the CTOD 140 has identical structural features and elements as the CTOD 120 but located in alternate locations. In such cases, the same reference character will be used, with the prime symbol, but the alternate location will be described. Where the CTOD 140 has identical structural features and elements as the CTOD 120 and those structural features and elements are located and used in an identical manner as in the CTOD 120, they will merely be listed, as describing them would be unduly repetitive and burdensome for the reader. It should be understood, then, that the description for the particular structural feature or element with respect to the CTOD 120 is equally applicable to the corresponding identical structural feature and element with respect to the CTOD 140, unless otherwise described. Finally, for simplicity of the illustrations, not all identical reference characters will be shown, if their corresponding identical reference characters are shown in a figure illustrating an alternate embodiment.

The CTOD 140 includes a glove body 31~~, a dorsal side 32~~, a palmar side 33~~, a proximal end 34~~, a distal end 35~~, an opening 36~~, an exterior surface 40~~, an interior surface 41~~, a strap 42~~, a thumb stall 44~~, an index finger stall 45~~, and finger stalls 46~~. The CTOD 140 includes a base pad 50~~, a spar 51~~ extending from a distal end 63~~ at the base pad 50~~ to an axle 64~~, and a pull 52~~ pivoted to the axle 64~~ on the spar 51~~ for movement along the double-arrowed arcuate line A~~ in FIG. 4B. The pull 52~~ includes a proximal end 53~~, a hole 54~~, struts 55~~ and 56~~, a stop 57~~, a distal end 60~~, a cradle 61~~, a hole 62~~, and a contact switch 80~~. The base pad 50~~ also carries a cable coupling 141, to which the cable 75~~ is coupled, and which is inside of a coupling housing 142. A cable housing 143 extends from the coupling housing 142 off the glove body 31~~ to a mount or platform 91~~ carried on a belt 92~~ around the operator's waist. A cable 144 is disposed within the cable housing 143 and is coupled to the cable coupling 141 in the coupling housing 142 at one end. At its other end, the cable 144 is coupled to a free end 124~~ of a lever arm 122~~ mounted for pivotal movement about a pivot end 123~~, so that the free end 124~~ oscillates and imparts reciprocal movement to the cable 144. The platform 91 includes an eccentric 125~~ driving the lever arm, a motor 130~~ rotating the eccentric 125~~, and a battery 131~~ powering the eccentric 125~~, as well as a programmable logic controller 72~~ and switches 74~~. The cable 144 is carried in the cable housing 143 without slack, so that movement of the free end 124 of the lever arm on the platform 91 on the belt 92 immediately imparts movement to the cable 75~~ and to the pull 52~~. With the battery 131~~ located off the glove body 31~~, a larger-sized battery 131~~ is carried than in the CTOD 120, so that the battery 131~~ lasts longer and provides more current, and thus needs to be replaced less frequently than with the CTOD 120.

Operation of the CTOD 140 is similar to that of the CTOD 120. The motor 130~~ rotates, according to the pre-programmed control instructions corresponding to the selected one the of the plurality of switches 74~~. In response, the eccentric 125~~ rotates against the lever arm 122~~, imparting oscillatory movement to the lever arm 122~~. The cable 144, connected to the free end 124~~ of the lever arm 125~~, is intermittently and cyclically retracted in response. This causes the cable 75~~, on the glove boy 31~~ and to which the cable 144 is attached, to also intermittently and cyclically retract. In turn, this causes the pull 52~~ to intermittently and cyclically move along the double-arrowed arcuate line A~~, and, in response, the operator's index finger, applied in the index finger stall 45~~ is intermittently and cyclically retracted toward the extended position along line A—— in FIG. 4B. The operator, however, continues to hold his finger down in the curled position to depress the trigger 20. When the index finger stall 45—— is bent, such as would occur when a finger applied to the index finger stall 45—— is curled around the trigger 20, the cable 75—— is extended and ready to be retracted so as to extend the index finger stall 45—— and the index finger applied thereto. When the cable 75—— is retracted, the cable 75—— is drawn back, and the proximal end 53—— of the pull 52—— is drawn toward the proximal end 34—— of the glove body 31—— to move the pull 52—— into the second position thereof. This causes the index finger stall 45—— to straighten. When the lever arm 122—— oscillates to the rearward position thereof, it retracts the cable 75—— quickly, and the operator's index finger is quickly returned toward the extended position thereof.

A Seventh Embodiment

Figure 5:
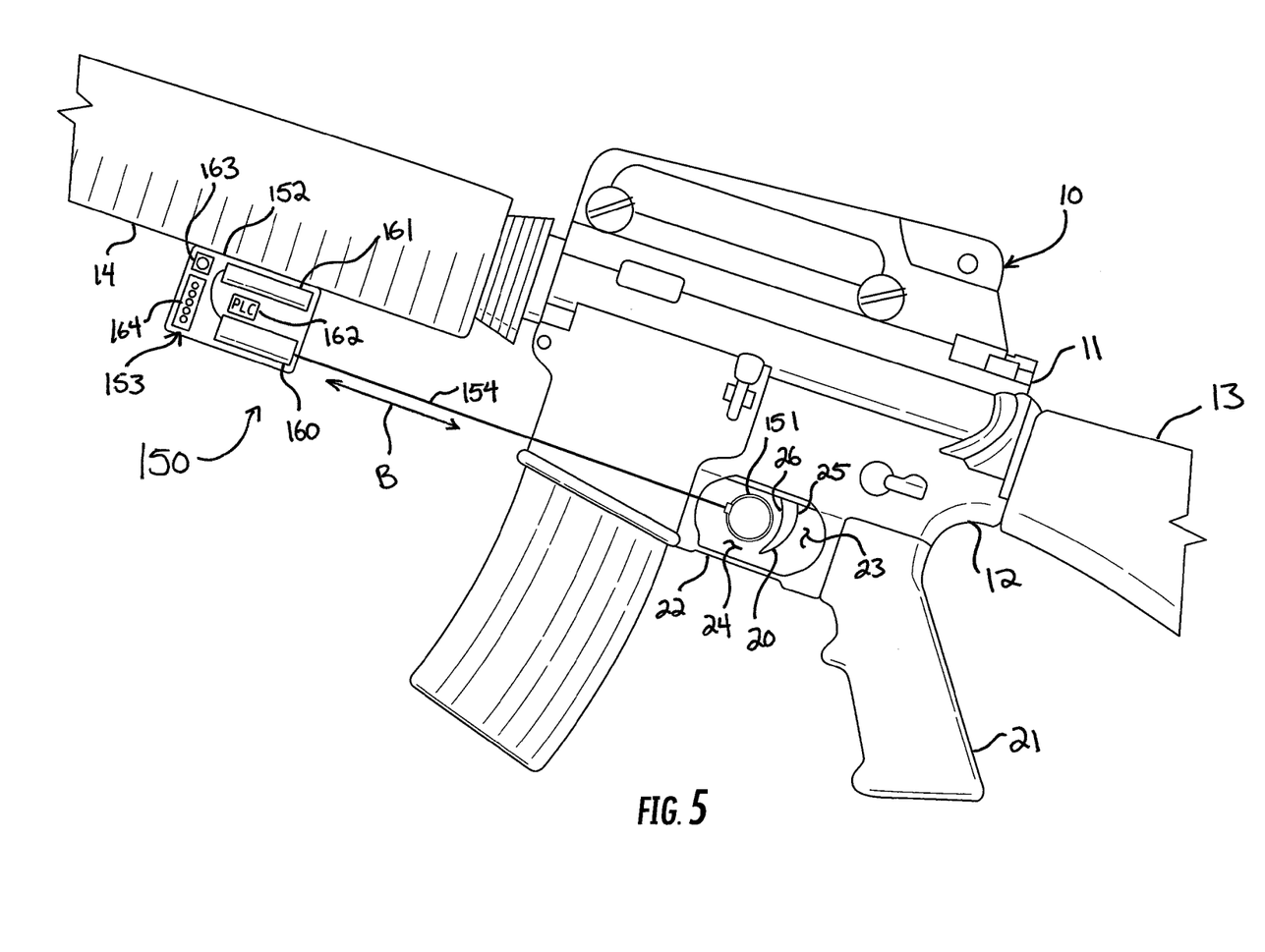
FIG. 5 is a side elevation view of a seventh embodiment of a cyclical trigger operation device constructed and arranged according to the principle of the invention, illustrated as it would appear installed on the firearm of FIG. 1.

FIG. 5 illustrates an embodiment of the present invention, constructed and arranged according to the principle of the invention, referred to as a cyclical trigger operation device (hereinafter, "CTOD") and marked with the reference character 150.

The CTOD 150 is rail-mounted to a barrel 14 of the firearm 10, as firearm accessories commonly are, and is adapted to enable the operator to quickly and cyclically depress the trigger 20 of the firearm 10. The CTOD 150 includes a pull 151 and a housing 152 containing a drive mechanism 153 coupled to the pull 151 to impart intermittent and cyclical movement to the pull 151. The pull 151 is a solid body in the form of a loop or ring sized and shaped to receive a finger. The pull 151 is rigid and is sized to fit in the finger gap 24 in front of the trigger 20 on the firearm 10. A cable 154 is secured to the pull 151 and extends forwardly to the drive mechanism 153 in the housing 152. FIG. 5 shows the interior of the housing 152, as it would appear with a cover removed, for clarity of the illustration and description.

The drive mechanism 153 of the CTOD 150 is identical to the drive mechanism 153 of the CTOD 30. It includes a pneumatic cylinder 160 with a stroke that is generally aligned along the length of the barrel 14. The drive mechanism 153 has a gas supply 161 to supply a gas to the pneumatic cylinder 160. In FIG. 5, the gas supply 161 is a cylindrical housing. The gas supply 161 is preferably replaceable gas cartridges, such as CO2 cartridges. The CO2 cartridges can be coupled to the pneumatic cylinder 160. A programmable logic controller 162 is carried in the housing 152 and is powered by a small battery 163. The programmable logic controller 162 controls the application and removal of gas to and from the pneumatic cylinder 160. A plurality of switches 164 are also carried in the housing 152 and are coupled to the programmable logic controller 162, so that the user may depress or select one of the plurality of switches to instruct the programmable logic controller to control the drive mechanism 153 in a particular, pre-programmed way, as is discussed later. Though the drive mechanism 153 shown in FIG. 5 is identical to the drive mechanism 65 used with the CTOD 30, one having ordinary skill in the art will readily appreciate that the drive mechanism 153 may be replaced with the drive mechanisms 101 or 121 for the CTODs 100 and 120, respectively. When the drive mechanism 121 is sued, it is preferable that the cable 75~ is routed through one or several pulleys to increase the retracting force of the lever arm 122.

The cable 154 extends from the pneumatic cylinder 160 to the pull 151, thereby operatively coupling the drive mechanism 153 to the pull 151 to impart movement to the pull 151 in response to actuation of the drive mechanism 153. The pneumatic cylinder 160 is aligned with the movement of the trigger 20, and the cable 154 is coupled to a piston in the pneumatic cylinder 160. The piston in the pneumatic cylinder 160 intermittently and cyclically reciprocates between a forward position and a retracted position in the pneumatic cylinder 160. Actuation of the pneumatic cylinder 160 retracts the cable 154.

In operation, an operator selects the desired performance of the CTOD 150 by selecting one of the plurality of switches 164, and then energizes the CTOD 150. The switches 164 each correspond to various performance functions of the CTOD 150. Some of the switches allow the operator to select a cycling speed. For instance, the operator may select a switch setting the cycling speed at three hundred rpm, in response to which the pneumatic cylinder will reciprocate approximately three hundred times in one minute to cycle movement of the pull 151 three hundred times in a minute, emanating a fast firing firearm. In another example, the operator may select a switch setting the cycling speed at nine hundred rpm, in response to which the pneumatic cylinder will reciprocate approximately nine hundred times in one minute to cycle movement of the pull 151 nine hundred times in a minute, emulating a very fast firing firearm. Some of the switches allow the operator to select a cycling duration. For example, the operator may select a switch setting the cycling duration to three pulses, in which case the pneumatic cylinder will reciprocate three times, so as to emulate a three-round burst of fire. In another example, the operator may select a switch setting the cycling duration to five pulses, in which case the pneumatic cylinder will reciprocate five times, so as to emulate a five-round burst of fire. In yet another example, the operator may select a switch setting the cycling duration to two seconds, in which case the pneumatic cylinder will reciprocate for two seconds, so as fire repeatedly for two seconds and then pause or stop.

After the performance of the CTOD 150 is set, the operator grips the firearm 10 at the pistol grip 21, placing his index finger proximate to the trigger 20. He then places his index finger through the pull 151 until the pull 151 fully and securely encircles his index finger. In some cases, a thimble may be worn which has a hook to improve the securement of the pull 151. The operator shoulders or readies the firearm 10 and takes aim at a target. Once a target is acquired, the operator fires the weapon by placing his finger against the trigger 20 and depressing or pulling the trigger 20 back toward the grip 21.

Upon the operator initially energizing the CTOD 150, the programmable logic controller 162 receives an activation signal and causes gas to be intermittently and cyclically supplied to and drawn from the pneumatic cylinder 160, such as through an on-board valve, according to the pre-programmed control instructions corresponding to the selected one the of the plurality of switches 164, causing the pneumatic cylinder 160 to reciprocate, and causing the cable 154 to be intermittently and cyclically retracted. In response, the operator's index finger, applied in pull 151, is intermittently and cyclically retracted toward the extended position along double-arrowed arcuate line B in FIG. 5. The operator, however, continues to hold his finger down in the curled position to depress the trigger 20. When the pneumatic cylinder 160 retracts the cable 154, a greater force is applied to the operator's finger than he applies to it, so that the finger is pulled to the extended position. In the extended position of the finger, the finger is pulled off of or away from the trigger 20, and the trigger 20 is returned to the ready position by the spring or other mechanism which returns the trigger 20 to the ready position. When the pneumatic cylinder 160 has retracted a full stroke, the supply of gas to the pneumatic cylinder 160 is removed, as instructed by the programmable logic controller 162, the operator's own force on his finger is now able to overcome the pneumatic cylinder 160, and his finger curls along line B to depress the trigger 20. When his finger depresses the trigger 20, it extends the pneumatic cylinder 160 a full stroke length so that the pneumatic cylinder 160 is ready to retract. With the operator continuing to curl his finger, and the pneumatic cylinder 160 intermittently and cyclically retracting the cable 154 to intermittently and cyclically extend the finger, the operator's finger is intermittently and cyclically curled and extended, and the trigger 20 is intermittently and cyclically depressed to the depressed position and allowed to return to the ready position. In this way, the firearm 10 intermittently and rapidly fires bullets, emulating fully-automatic fire.

The present invention is described above with reference to a preferred embodiment. However, those skilled in the art will recognize that changes and modifications may be made in the described embodiment without departing from the nature and scope of the present invention. To the extent that such modifications and variations do not depart from the spirit of the invention, they are intended to be included within the scope thereof.

Having fully and clearly described the invention so as to enable one having skill in the art to understand and practice the same, the invention claimed is:

The invention claimed is:

1. A device comprising:
   a glove having a finger stall and a contact switch carried on the glove for detecting contact between the glove and an object;
   a pull mounted at the finger stall; and
   a drive mechanism operatively coupled to the pull to move the finger stall from a bent configuration toward a straight configuration;
   wherein the drive mechanism actuates in response to an activation signal, and the activation signal comprises the contact switch detecting the contact between the glove and the object.

2. The device of claim 1, wherein the drive mechanism actuates cyclically in response to the activation signal.

3. The device of claim 1, wherein the contact switch is a pressure switch.

4. The device of claim 1, wherein:
   the drive mechanism includes a pneumatic cylinder and a gas supply coupled in gaseous communication to the pneumatic cylinder; and
   the pneumatic cylinder is coupled to the pull to move the finger stall toward the straight configuration.

5. The device of claim 1, wherein:
   the drive mechanism includes a solenoid and a battery coupled to the solenoid to provide power to the solenoid; and
   the solenoid is coupled to the pull to move the finger stall toward the straight configuration.

6. The device of claim 1, wherein:
   the drive mechanism includes an eccentric mounted for rotational movement; and
   the eccentric is coupled to the pull to move the finger stall toward the straight configuration.

7. The device of claim 6, wherein:
   the drive mechanism further includes a lever arm having a pivot end and a free end;
   the free end of the lever arm is coupled to the pull; and
   the eccentric is in contact with the lever between the pivot and free ends to impart pivotal movement to the lever arm in response to rotational movement of the eccentric, so as to move the finger stall toward the straight configuration.

8. The device of claim 1, wherein the pull includes a cradle configured to support a finger fit through the finger stall.

9. The device of claim 8, wherein the cradle includes a central hole formed therethrough providing a contact space for the finger fit through the finger stall to contact a trigger.

10. The device of claim 1, wherein the drive mechanism is carried on the glove.

* * * * *